Jan. 30, 1968
W. R. MAHONEY ET AL 3,366,521
METHOD FOR THE PRODUCTION OF CELLULOSE
ACETATE CIGARETTE FILTER TIPS
Original Filed July 19, 1960
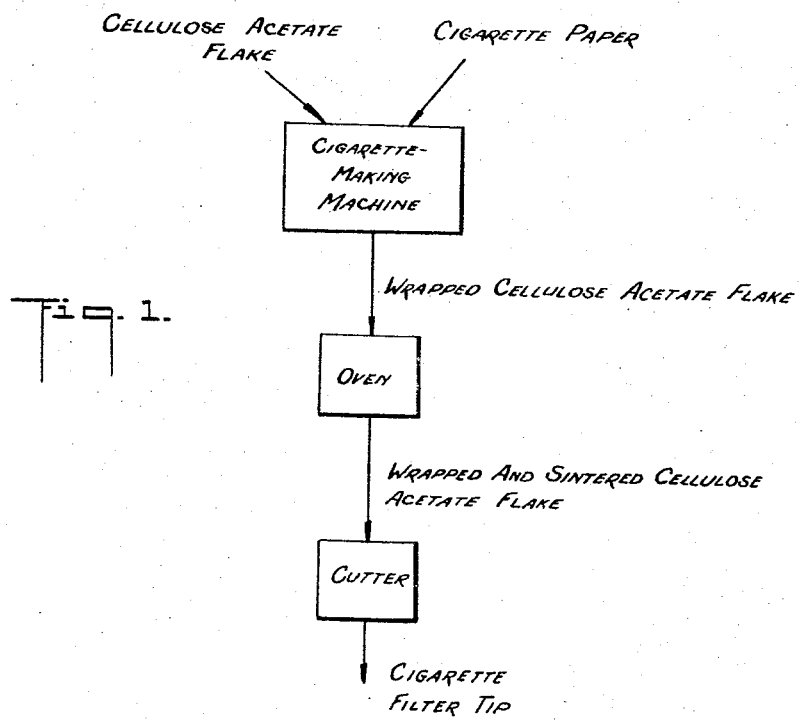
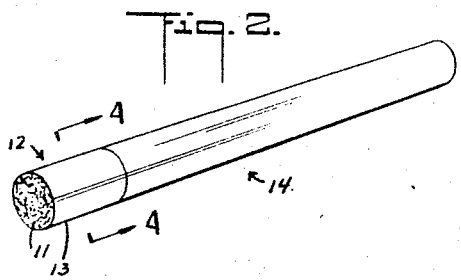
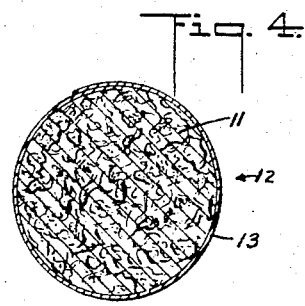
INVENTORS
Joseph L. Barach
William R. Mahoney
BY
*D. J. DeWitt & L. Horn*
ATTORNEYS 3,366,521
METHOD FOR THE PRODUCTION OF CELLULOSE ACETATE CIGARETTE FILTER TIPS
William R. Mahoney, Gulf Breeze, Fla., and Joseph L. Barach, Charlotte, N.C., assignors to Celanese Corporation, a corporation of Delaware
Continuation of abandoned application Ser. No. 346,288, Feb. 20, 1964, which is a division of application Ser. No. 43,863, July 19, 1960. This application Jan. 30, 1967, Ser. No. 612,733
4 Claims. (Cl. 156—62.2)

ABSTRACT OF THE DISCLOSURE

Method for the production of cellulose acetate flake cigarette filter tips employing flake having a particle size of about 5 to 20 mesh, a substantial proportion of the particles having a particle size of about 5 to 10 mesh; and a bulk density of less than about 20 pounds per cubic foot.

---

The present application is a continuation of application Ser. No. 346,288 filed Feb. 20, 1964, now abandoned, which is a division of application Ser. No. 43,863 filed July 19, 1960, now U.S. Patent 3,126,009, which in turn is a continuation-in-part of application Ser. No. 640,667 filed Feb. 18, 1959, now abandoned.

This invention relates to the production of cigarette filter tips from cellulose esters, such as cellulose acetate.

It has previously been proposed that cigarette filter tips be prepared from spun cellulose acetate filamentary material. In one commonly used process a continuous bundle of continuous filaments of cellulose acetate, said bundle being known as tow, is fed to the wrapping section of a cigarette-making machine, where it is enclosed in a paper wrapper. The resulting wrapped tow is then cut to short lengths suitable for use as cigarette filter tips. This process has several disadvantages. For example, there is a considerable tendency for the continuous tow to spring out of its wrapper before the cutting operation; this results in jamming of the machine. Furthermore, the filter tips produced by this process are unduly expensive. In addition such tips do not have as high a filtering power as desired.

It is therefore an object of this invention to provide a process for making a novel cigarette filter tip, which will be free from the foregoing defects.

A further object of this invention is the provision of a new process for making a new cigarette filter tip made made from cellulose ester flake material.

Other objects of this invention will be apparent from the following detailed description and claims. In this description and claims all proportions are by weight unless otherwise indicated.

The cigarette filter tips of this invention are made from finely divided cellulose ester material. Preferably the finely divided cellulose ester material used is that known in the industry as "flake," prepared by precipitating the cellulose ester in the form of fibrous or hairy porous particles from a solution of said cellulose ester in a solvent. In accordance with one aspect of the invention, the loose cellulose ester flake material is enclosed in a wrapping to form a rodlike wrapped structure containing the discrete particles of said flake material. Thereafter, this wrapped structure is treated to cause the discrete particles to cohere at randomly spaced points of contact and is cut to the length of the desired filter tip.

The cellulose ester flake material of this invention is preferably made of cellulose acetate, although other cellulose esters such as the propionate, butyrate, acetate-propionate or acetate-butyrate may be employed in place of the acetate or in admixture therewith. While the cellulose acetate may be of any desired type, e.g. cellulose triacetate, best results have been obtained with acetone-soluble secondary cellulose acetate having an acetyl content of about 50 to 56% by weight calculated as combined acetic acid. When the acetyl value ranges from about 52 to 55% and preferably about 53% the flake comprises long, strong, soft hairy fibers of excellent filtration characteristics. The precipitation of the cellulose ester to form the flake may be effected in known manner; for example by adding dilute acetic acid to a solution of the cellulose acetate in glacial acetic acid and thoroughly agitating so as to produce a porous fibrous flake, and then washing. Examples of methods for forming such a flake are found in U.S. Patent No. 2,010,111, as well as in U.S. Patent No. 2,740,776, and in the prior art discussed therein. Flake screened to a particle size in the range of about 5 to 20 mesh has given very good results. Preferably at least half the flake has a particle size in the range of about 5 to 10 mesh. Advantageously the bulk density of the flake is less than about 20 pounds per cubic foot and preferably about 15 pounds or less per cubic foot as contrasted with a density of more than 80 pounds per cubic foot for solid secondary cellulose acetate. In addition to the decreased weight and thus cost per filter, the low density flake affords a large surface for improved filtration while permitting easy drawing of smoke therethrough.

In a highly effective preferred embodiment of this invention the cohering of the particles of flake, after wrapping, is effected by the application of heat so as to sinter said particles together. When this embodiment of the invention is employed it is found most advantageous to apply a suitable plasticizer to the flake in order to reduce the softening temperature of the surfaces of the particles. The plasticizer should be substantially non-volatile at room temperature and is preferably substantially odorless, colorless, tasteless and non-toxic. Examples of suitable plasticizers of this type are di-lower alkoxy-lower alkyl phthalates such as di-methoxyethyl phthalate, dialkyl phthalates such as diethyl phthalate, dioctyl phthalate or diisooctyl phthalate, lower alkyl phthalyl lower alkyl glycolates such as methyl phthalyl ethyl glycolate, ethyl phthalyl ethyl glycolate or butyl phthalyl butyl glycolate, tri-lower alkyl citrates and acylated derivatives thereof such as tri-ethyl citrate, acetyl triethyl citrate, or acetyl tributyl citrate, di-alkyl sebacates such as dibutyl sebacate, triacetin, and blends of the foregoing plasticizers with each other or with other plasticizers, such as blends of triacetin and mono-octyl diphenyl phosphate. The plasticizer may be applied conveniently by spraying it onto the flake. To insure even distribution of plasticizer the particles of the flake may be tumbled or otherwise agitated during and/or after the application of the plasticizer thereto. Another method of applying the plasticizer is by immersing the particles in a bath containing the plasticizer. For example, the flake may be immersed in and then withdrawn from a solution of the plasticizer in a volatile non-solvent for the cellulose ester, or an aqueous emulsion of the plasticizer; in this case the water or other non-solvent is preferably evaporated before the flake material is wrapped. The amount of plasticizer applied may be varied depending on the particular plasticizer and the particular cellulose ester chosen; one suitable range is 5% to 30% of plasticizer based on the weight of the cellulose ester.

The wrapping of the flake material may be carried out on the usual cigarette making machinery. Thus the flake material may be fed in a continuous stream onto a belt or series of belts where the flake material is compacted, and then brought into contact with a continuous strip of cigarette paper in precisely the same way as the tobacco particles are fed, compacted and brought into contact with the paper on a cigarette-making machine, such as that described in U.S. Patents Nos. 2,283,394, 2,247,413 or 2,208,504. The paper and the flake material may be brought into contact with a shaping element which bends the sides of the strip of paper around the flake material, after which the parallel longitudinal edges of the paper strip are sealed, as by gluing, to form a continuous wrapped rod. As is common in the cigarette making art, during this operation one side of the paper strip, opposite the side on which the particles being wrapped are resting, is maintained in contact with a supporting wrapping tape, belt or other forming element, such as is shown in U.S. Patents Nos. 2,208,504 and 2,247,413, mentioned above. After the wrapping operation this forming element is removed from contact with the paper. The wrapped rod has approximately the same cross-sectional configuration as the usual cigarette, i.e. it is roughly a cylinder about 25 to 27 mm. in circumference but this may be altered as required.

In the preferred embodiment of this invention the wrapped rod containing the discrete particles of flake material is baked to cause the sintering of the particles at random points of contact. The temperature and time of baking may be varied, depending on the type of cellulose ester particles and amount and character of plasticizer. Baking in a hot air oven at 170° C. for an hour has given good results with secondary cellulose acetate flake plasticized with approximately 20% of triethyl citrate. At lower temperatures, e.g. 140–150° C., longer times, generally two hours or more, are satisfactory. Instead of hot air, other heating media may be employed. When the plasticizer is one which is more active at room temperature, e.g. triacetin, the baking operation may be eliminated, since the same effect is obtained by allowing the wrapped material, containing, for example about 20% of plasticizer, to stand for some time, e.g. 2 hours, at room temperature. In either case the resulting wrapped rod comprising the cohering particles of cellulose ester may then be incorporated into a cigarette in a manner conventionally employed for making cigarette filter tips. Thus the wrapped rod, which may have been cut into intermediate lengths before the particles were bonded together, may be cut into lengths suitable for individual filter tips, e.g. 11 to 15 mm. lengths, and wrapped in cigarette paper together with the tobacco to form a cigarette. The wrapped rod may also be cut to twice filter-tip length and incorporated in cigarette paper with suitable lengths of tobacco at each end, in accordance with methods well known in the cigarette art, after which the resulting structure may be cut transversely through the middle of the double length of filter to form two filter-tip cigarettes.

If desired, the original wrapper may be removed from the rod of cohering particles of cellulose ester before the final wrapping of the rod and tobacco to form the cigarette. For example, paper need not be used for the initial wrapping of the discrete cellulose ester particles. Instead, these particles may be wrapped in another sheet material. Thus they may be wrapped merely in a supporting wrapping tape or belt, such as that referred to above, and treated to cause the particles to cohere while so wrapped, after which the supporting wrapping belt may be unwrapped or otherwise removed, leaving a self-supporting porous rod of cohering particles, which rod may be cut and incorporated into a cigarette as the filter tip thereof. In either case the forming of the flake into coherent rod form takes place without substantial relative longitudinal movement of wrapping material and flake.

The filter tips of this invention are highly effective for the removal of tars and other undesirable substances from tobacco smoke. In contrast to filter tips made in the usual manner, from cellulose acetate tow, they produce a more turbulent, rather than laminar, flow of the smoke without substantial effect on the ease of drawing the smoke through the filter. In addition, they can be manufactured at lower cost, using standard cigarette-making machinery if desired.

In the drawing, which illustrates the process and product of this invention, as well as the flake used, FIG. 1 is a flow diagram of the process of making the filter tip, FIG. 2 shows the cigarette embodying the filter tip of this invention, FIG. 3 is an enlarged view of individual particles of a cellulose acetate flake suitable for use in this invention, and FIG. 4 is an enlarged cross-sectional view, taken through the filter tip, along the line 4—4 of FIG. 3.

In FIGS. 2 and 4 of the drawing, reference numeral 11 designates the sintered flake particles of the filter tip 12, enclosed within a cigarette paper wrapper 13 and positioned at one end of the cigarette 14.

The following examples are given to illustrate this invention further.

*Example I*

Flake of fibrous porous particles of cellulose acetate of 54.5% acetyl content, calculated as acetic acid, is passed through a No. 5 mesh screen (4 mm. openings) and then a No. 20 mesh screen (0.84 mm. openings). The flake retained on the No. 20 mesh screen is tumbled in a rotating vessel while triethyl citrate, a non-toxic plasticizer, is sprayed intermittently into the vessel, the total amount of triethyl citrate being ⅕ the weight of cellulose acetate. The appearance of the flake after the application of the plasticizer is substantially unchanged. The material is then fed to a standard cigarette-making machine where it is compacted and wrapped in standard thin cigarette paper to form a generally circular rod having a circumference of 27 millimeters weighing 18½ grams per meter, of which 0.7 gram is the weight of the paper, with the edges of the paper overlapped and glued together. The wrapped material is placed in a hot air oven where it is baked at 170° C. for 60 minutes. After cooling, the baked material is cut into 15 mm. lengths and incorporated as the filter-tip in a cigarette 70 mm. in length. This cigarette when smoked draws easily and filters the smoke efficiently. The filter tip, though highly porous, does not break or crumble on handling, even after the paper is removed.

*Example II*

Example I is repeated, substituting dimethoxyethyl phthalate for the triethyl citrate, with similar results.

*Example III*

If Example I is repeated employing cellulose acetate flake of 53% acetyl value and having a bulk density of 15 pounds per cubic foot the resulting filter will be even lighter in weight although of substantially equal efficiency.

It is to be understood that the foregoing detailed description is given merely by way of illustration and that many variations may be made therein without departing from the spirit of our invention.

The embodiments of the invention in which an exclusive property or privileges is claimed are defined as follows:

1. Process for the production of cigarette filter tips which comprises applying a plasticizer to the surfaces of particles of cellulose acetate fibrous flake having an acetyl value in excess of about 52% by weight calculated as combined acetic acid, having a bulk density less than about 20 pounds per cubic foot and a particle size of about 5 to 20 mesh, a substantial proportion of the particles having a particle size of about 5 to 10 mesh bringing a mass of discrete particles of said flake into contact with a sheet material, wrapping said sheet material around said fibrous flake to form a cylindrical rod comprising said discrete particles pressed together within said sheet material, and heating to effect bonding of said particles together at points of contact.

2. Process as set forth in claim 1 in which said rod is cut into a length of about 11 to 15 mm. for use as a cigarette filter.

3. Process as set forth in claim 1 in which said plasticizer is selected from the group consisting of triethyl citrate, methyl phthalyl ethyl glycolate, dimethoxyethyl phthalate, and triacetin.

4. Process as set forth in claim 3 in which the proportion of plasticizer is about 5 to 30%, based on the weight of cellulose acetate.

References Cited

UNITED STATES PATENTS

| | | | |
|---|---|---|---|
| 2,794,239 | 6/1957 | Crawford et al. | 131—208 |
| 2,805,671 | 9/1957 | Hackney et al. | 131—208 |
| 2,828,752 | 4/1958 | Jackson | 131—208 |
| 2,979,058 | 4/1961 | Schur | 131—94 X |
| 3,201,505 | 8/1965 | Meyer | 131—10 X |

FOREIGN PATENTS 757,841   9/1956   Great Britain.

SAMUEL KOREN, *Primary Examiner.*

MELVIN D. REIN, *Examiner.*